(12) United States Patent
Jain et al.

(10) Patent No.: US 8,867,476 B2
(45) Date of Patent: Oct. 21, 2014

(54) SMALL DATA COMMUNICATIONS IN A WIRELESS COMMUNICATION NETWORK

(75) Inventors: Puneet K. Jain, Hillsboro, OR (US); Shao-Cheng Wang, Hillsboro, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/880,962

(22) PCT Filed: Mar. 27, 2012

(86) PCT No.: PCT/US2012/030763
§ 371 (c)(1),
(2), (4) Date: Jul. 22, 2013

(87) PCT Pub. No.: WO2013/006219
PCT Pub. Date: Jan. 10, 2013

(65) Prior Publication Data
US 2013/0308564 A1     Nov. 21, 2013

Related U.S. Application Data

(60) Provisional application No. 61/504,054, filed on Jul. 1, 2011.

(51) Int. Cl.
*H04W 8/02* (2009.01)
(52) U.S. Cl.
USPC ........... 370/329; 370/254; 370/328; 455/517; 455/466
(58) Field of Classification Search
CPC ....... H04W 8/02; H04W 88/02; H04W 88/06; H04W 92/02; H04W 80/04; H04W 4/005; H04W 28/04; H04W 72/04
USPC .................. 370/329, 328, 254; 455/517, 460
See application file for complete search history.

(56) References Cited

U.S. PATENT DOCUMENTS 8,218,503 B2 *   7/2012   Terry et al. .................... 370/331
8,280,417 B2    10/2012   Venkatachalam et al.
(Continued)

FOREIGN PATENT DOCUMENTS

WO    WO2011099821 A2    8/2011
WO    WO2013022472 A1    2/2013

OTHER PUBLICATIONS

International Search Report and Written Opinion mailed Mar. 20, 2013 from International Application No. PCT/US2012/063065.
(Continued)

*Primary Examiner* — Jamal Javaid
(74) *Attorney, Agent, or Firm* — Schwabe, Williamson & Wyatt, P.C.

(57) ABSTRACT

Embodiments of the present disclosure describe techniques and configurations for transmitting small data payloads such as, for example, Machine Type Communication (MTC) data in a wireless communication network. A system may include features to implement an interworking function (IWF) to receive, from a machine type communication (MTC) server, a trigger to send a data payload, which is smaller than a preconfigured threshold, to a user equipment (UE) over a wireless communication network, and send, over a first reference point to a first module including a Mobility Management Entity (MME) or a Serving GPRS (General Packet Radio Service) Support Node (SGSN) or a second reference point to a second module including a Home Location Register (HLR) or a Home Subscriber Server (HSS), the data payload and a request to forward the data payload to the UE.

12 Claims, 7 Drawing Sheets

(56) References Cited

U.S. PATENT DOCUMENTS

| | | | |
|---|---|---|---|
| 8,565,100 B2* | 10/2013 | Jokimies et al. | 370/242 |
| 2003/0112793 A1* | 6/2003 | Sengodan | 370/352 |
| 2005/0026597 A1 | 2/2005 | Kim et al. | |
| 2007/0123195 A1 | 5/2007 | Lv et al. | |
| 2007/0169107 A1 | 7/2007 | Huttunen | |
| 2011/0134841 A1 | 6/2011 | Shaheen | |
| 2011/0140846 A1 | 6/2011 | Blanz et al. | |
| 2011/0201343 A1 | 8/2011 | Pinheiro et al. | |
| 2011/0213871 A1 | 9/2011 | DiGirolamo et al. | |
| 2012/0257571 A1 | 10/2012 | Liao | |
| 2013/0003576 A1 | 1/2013 | Segura et al. | |
| 2013/0308564 A1 | 11/2013 | Jain et al. | |

OTHER PUBLICATIONS

International Search Report and Written Opinion mailed Jun. 28, 2012 from International Application No. PCT/US2012/031042.

3GPP, "Technical Specification Group Services and System Aspects-;System Improvements for Machine-Type Communications;(Release 11)," 3GPP TR 23.888 V1.5.0, LTE, Oct. 2011, 155 pages.

International Application No. PCT/US2012/030763 filed Mar. 27, 2012.

International Application No. PCT/US2012/031042 filed Mar. 28, 2012.

U.S. Appl. No. 13/535,140, filed Jun. 27, 2012.

3GPP, "Technical Specification Group Services and System Aspects; Service requirements for Machine-Type Communications (MTC); Stage 1 (Release 12)," 3GPP TS 22.368 V11.5.0, Lte Adavanced, Jun. 29, 2012, Section 7.2.14.3, 25 pages.

3GPP, "Technical Specification Group Core Network and Terminals; Technical realization of Cell Broadcast Service (CBS) (Release 11)," 3GPP TS 23.041 V11.3.0, Jun. 27, 2012, Section 9.4.1.2.2, 62 pages.

3GPP, "Technical Specification Group Services and System Aspects; System Improvements for Machine-Type Communications (Release 11)," 3GPP TR 23.888 V1.7.0, Lte, Aug. 17, 2012, 165 pages.

3GPP, "Technical Specification Group Radio Access Network; Broadcast/Multicast Control (BMC) (Release 10)," 3GPP TS 25.324 V10.0.0, Mar. 31, 2011, 26 pages.

3GPP, "Technical Specification Group Radio Access Network; UTRAN Iu-BC Interface: Service Area Broadcast Protocol (SABP) (Release 10)," 3GPP TS 25.419 V10.2.0, Sep. 27, 2011, 78 pages.

3GPP, "Technical Specification Group GSM/EDGE Radio Access Network; Base Station Controller—Base Transceiver Station (BSC—BTS) interface; Layer 3 specification (Release 10)," 3GPP TS 48.058 V10.0.0, GSM Global System for Mobile Communications, Mar. 23, 2011, 84 pages.

3GPP, "Technical Specification Group GSM/EDGE Radio Access Network; Short Message Service Cell Broadcast (SMSCB) support on the mobile radio interface (Release 10)," 3GPP TS 44.012 V10.0.0, GSM Global System for Mobile Communications, Mar. 23, 2011, 14 pages.

U.S. Appl. No. 13/610,772, filed Sep. 11, 2012.

International Search Report and Written Opinion mailed Jun. 28, 2012 from International Application No. PCT/US2012/030763.

International Preliminary Report on Patentability mailed Jan. 29, 2013 from International Application No. PCT/US2012/030763.

3GPP, "Technical Specification Group Services and System Aspects; Service requirements for Machine-Type Communications (MTC); Stage 1 (Release 10)," 3GPP TS 22.368 V10.0.0, Lte, Mar. 2010, 25 pages.

3GPP, "Technical Specification Group Services and System Aspects; System Improvements for Machine-Type Communications; (Release 10)," 3GPP TR 23.888 V0.32, Lte, Mar. 2010, 33 pages.

3GPP, "Technical Specification Group Services and System Aspects; Architecture Enhancements to facilitate communications with Packet Data Networks and Applications; (Release 11)," 3GPP TS 23.682 V0.2.0 , Lte, Feb. 2012, 23 pages.

3GPP, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.1.0 (Jun. 2013), Jun. 24, 2013, Lte Advanced, 291 pages.

* cited by examiner

SMALL DATA COMMUNICATIONS IN A WIRELESS COMMUNICATION NETWORK

CROSS REFERENCE TO RELATED APPLICATIONS

The present application is a national phase entry under 35 U.S.C. §371 of International Application No. PCT/US2012/030763, filed Mar. 27, 2012, entitled "SMALL DATA COMMUNICATIONS IN A WIRELESS COMMUNICATION NETWORK", which designates the United States of America, and which claims priority to U.S. Provisional Patent Application No. 61/504,054, filed Jul. 1, 2011, the entire contents and disclosures of which are hereby incorporated by reference in their entireties.

FIELD

Embodiments of the present disclosure generally relate to the field of wireless communication systems, and more particularly, to techniques and configurations for transmitting small data payloads such as, for example, Machine Type Communication (MTC) data in a wireless communication network.

BACKGROUND

Mobile networks that facilitate transfer of information at broadband rates continue to be developed and deployed. Such networks may be colloquially referred to herein as broadband wireless access (BWA) networks. A variety of different device types may be used in broadband wireless technologies. Such devices may include, for example, personal computers, smartphone, laptops, netbooks, ultrabooks, tablets, handheld devices, and other consumer electronics such as music players, digital cameras, etc., that are configured to communicate over the wireless broadband networks.

Machine-to-Machine (M2M) may refer to technologies that allow wireless and wired systems to communicate with other devices without any human intervention. M2M may use a device such as, for example, a sensor or meter to collect information, which may be relayed through a network (e.g., wireless, wired, or hybrid) to an application that translates the information into meaningful data. The expansion of BWA networks across the world and accompanying increased speed/bandwidth and reduced power of wireless communication has facilitated growth of M2M communication. Although the amount of data sent by M2M devices is very small, a large number of these devices, in combination, may increase a load on a network. Current techniques for transmitting small data payloads such as machine type communication (MTC) data may be inefficient or incompatible with emerging BWA networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide techniques and configurations for transmitting small data payloads such as, for example, Machine Type Communication (MTC) data in a wireless communication network, triggering or monitoring small data communications, and signaling improvements of the same. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to broadband wireless access (BWA) networks including networks operating in conformance with one or more protocols specified by the 3$^{rd}$ Generation Partnership Project (3GPP) and its derivatives, the WiMAX Forum, the Institute for Electrical and Electronic Engineers (IEEE) 802.16 standards (e.g., IEEE 802.16-2005 Amendment), long-term evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, enhanced node Bs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

Figure 1:
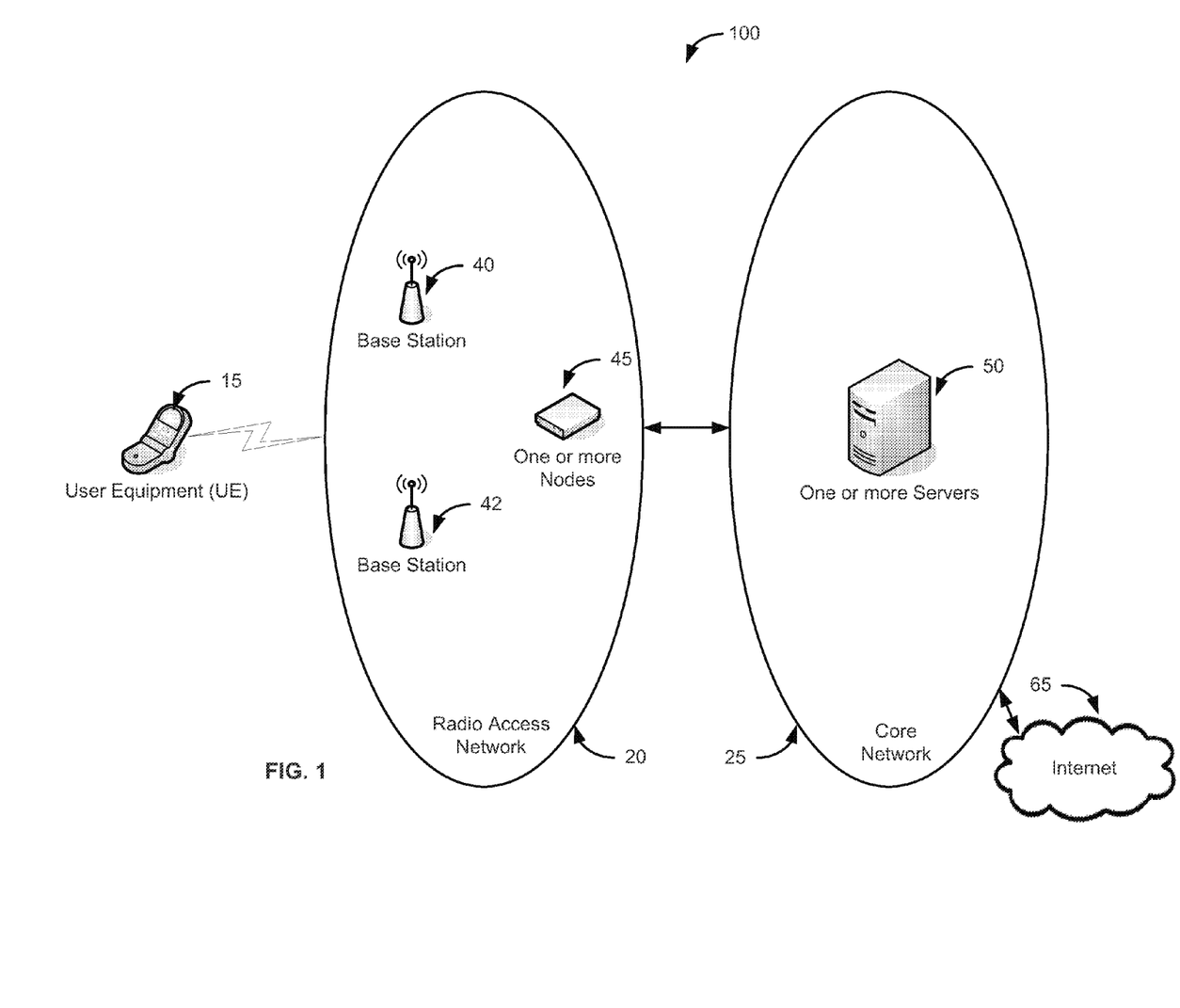
FIG. 1 schematically illustrates an example broadband wireless access (BWA) network in accordance with some embodiments.

FIG. 1 schematically illustrates an example broadband wireless access (BWA) network 100 in accordance with some embodiments. The BWA network 100 may include one or more radio access networks (hereinafter "RAN 20") and a core network 25.

User Equipment (UE) 15 may access the core network 25 via a radio link ("link") with a base station (BS) such as, for example, one of base stations 40, 42, etc., in the RAN 20. The UE 15 may, for example, be a subscriber station that is configured to communicate with the base stations 40, 42 in conformance with one or more protocols. The following description is provided for an example BWA network 100 that conforms with 3GPP for ease of discussion, however, subject matter of the present disclosure is not limited in this regard and the described embodiments may apply to other networks that benefit from the principles described herein. In some embodiments, the base stations 40, 42 may include enhanced Node B (eNB) stations and a UE 15 that is configured to communicate using a multiple-input and multiple-output (MIMO) communication scheme. One or more antennas of the UE 15 may be used to concurrently utilize radio resources of multiple respective component carriers (e.g., which may correspond with antennas of eNB stations 40, 42) of the BWA network 100. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

While FIG. 1 generally depicts the UE 15 as a cellular phone, in various embodiments the UE 15 may be a personal computer (PC), a notebook, ultrabook, netbook, smartphone, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like. The base stations 40, 42 may include one or more antennas, one or more radio modules to modulate and/or demodulate signals transmitted or received on an air interface, and one or more digital modules to process signals transmitted and received on the air interface.

In some embodiments, communication with the UE 15 via RAN 20 may be facilitated via one or more nodes 45. The one or more nodes 45 may act as an interface between the core network 25 and the RAN 20. According to various embodiments, the one or more nodes 45 may include a Mobile Management Entity (MME) (e.g., SGSN/MME 58 of FIG. 2) that is configured to manage signaling exchanges (e.g., authentication of the UE 15) between the base stations 40, 42 and the core network 25 (e.g., one or more servers 50), a Packet Data Network Gateway (PGW) (e.g., GGSN/PGW 51 of FIG. 2) to provide a gateway router to the Internet 65, and/or a Serving Gateway (SGW) to manage user data tunnels or paths between the base stations 40, 42 of the RAN 20 and the PGW. Other types of nodes may be used in other embodiments.

The core network 25 may include logic (e.g., a module) to provide authentication of the UE 15 or other actions associated with establishment of a communication link to provide a connected state of the UE 15 with the BWA network 100. For example, the core network 25 may include one or more servers 50 that may be communicatively coupled to the base stations 40, 42. In an embodiment, the one or more servers 50 may include a Home Subscriber Server (HSS) (e.g., HLR/HSS 56 of FIG. 2), which may be used to manage user parameters such as a user's International Mobile Subscriber Identity (IMSI), authentication information, and the like. The core network 25 may include other servers, interfaces, and modules some of which are further described in connection with FIG. 2. The one or more servers 50 may include over-the-air (OTA) servers in some embodiments. In some embodiments, logic associated with different functionalities of the one or more servers 50 may be combined to reduce a number of servers, including, for example, being combined in a single machine or module.

According to various embodiments, the BWA network 100 is an Internet Protocol (IP) based network. For example, the core network 25 may be an IP based network. Interfaces between network nodes (e.g., the one or more nodes 45) may be based on IP, including a backhaul connection to the base stations 40, 42. In some embodiments, the BWA network 100 includes a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. In some embodiments, the RAN 20 may include GSM EDGE Radio Access Network (GERAN) where EDGE stands for Enhanced Data for GSM Evolution, Universal Terrestrial Radio Access Network (UT-RAN), or Evolved UTRAN (E-UTRAN. The BWA network 100 may operate in accordance other network technologies in other embodiments.

Figure 2:
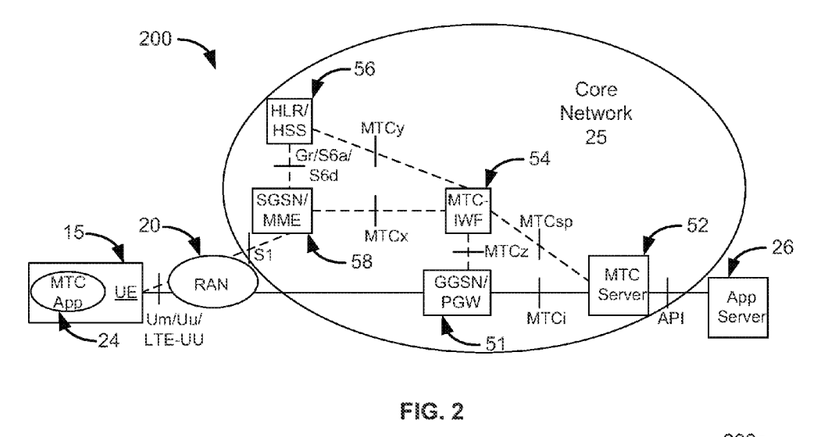
FIG. 2 schematically illustrates system architecture for transmitting a small data payload, in accordance with some embodiments.

FIG. 2 schematically illustrates system architecture 200 for transmitting a small data payload, in accordance with some embodiments. The system architecture 200 may be configured to efficiently perform small data transmissions intended for use with Machine-to-Machine (M2M) communication such as, for example, MTC communication. For example, user equipment (UE) 15 may include or be communicatively coupled with smart meters or sensors to collect small amounts of information for transmission (e.g., health monitoring devices, vending machines, and the like configured to collect information about temperature, inventory, etc.). In some embodiments, an Application server 26 may be configured to send a small data payload in a message (e.g., to request MTC information such as sensor or meter measurement, inventory level, etc.). The data payload (e.g., MTC data payload) may be smaller than a preconfigured threshold to define a small data payload in some embodiments. The preconfigured threshold may be set by subscription or network operator policy in some embodiments.

According to various embodiments, the small data payload may be sent by the UE 15 to an MTC server 52 or Application server 26 via RAN 20 and core network 25 or the small data payload may be sent by the Application server 26 or MTC server 52 to the UE 15 via the core network 25 and the RAN 20. For example, an Application server 26 may be configured (e.g., by an MTC user) to send or trigger sending of a small data payload to user equipment (UE) 15. The Application server 26 may be communicatively coupled with the core network 25 using, for example, an Internet connection (e.g., Internet 65 of FIG. 1). In another example, an MTC application 24 that is communicatively coupled with the UE 15 may be configured to send or trigger the sending of a small data payload to the Application server 26. In some embodiments, the UE 15 is an MTC device configured to send or receive small data payloads and/or communicate with the MTC application 24. In some embodiments, the UE 15 may include the MTC application 24.

The system architecture 200 includes an MTC server 52, which is configured to connect to the core network 25 to communicate with UEs (e.g., UE 15) that are configured for MTC communication. The MTC server 52 may be further configured to communicate with an Interworking Function (IWF) such as MTC-IWF 54 to trigger a transmission of a small data payload. In some embodiments, the MTC server 52 may be referred to as a Services Capability Server (SCS).

The MTC-IWF 54 may terminate an MTCsp reference point or interface (hereinafter "reference point") between the MTC server 52 and the MTC-IWF 43. The MTC-IWF 43 may be configured to hide internal public land mobile network (PLMN) topology and relay or translate signaling protocols used over the MTCsp reference point to invoke specific functionality in the PLMN. In some embodiments, the MTC-IWF 54 may authenticate the MTC server 52 before communication is established with the core network 25 and/or control plane requests from the MTC server 52 are authorized. According to various embodiments, the dashed lines between modules (e.g., 54, 58) represent a control plane and the solid lines between modules represent a user plane. While a particular plane may be shown between modules, other embodiments may include additional/alternative planes.

In one embodiment, the MTC-IWF 54 may terminate an MTCx reference point between a module including a Mobility Management Entity (MME) and/or a Serving GPRS (General Packet Radio Service) Support Node (SGSN) such as, for example, SGSN/MME 58. In some embodiments, a first MTCx1 reference point may terminate on the MME of the SGSN/MME 58 and a second MTCx2 reference point may terminate on the SGSN of the SGSN/MME 58. In another embodiment, the MTC-IWF 54 may terminate an MTCy reference point between a module including a Home Location Register (HLR) and/or Home Subscriber Server (HSS) such as, for example, HLR/HSS 56. In another embodiment, the MTC-IWF 54 may terminate an MTCz reference point between a module including a Gateway GPRS Support Node (GGSN) and/or Packet Data Network Gateway (PGW) such as, for example, GGSN/PGW 51. The MTCx, MTCy, and MTCz reference points are not limited to the example names provided (e.g., MTCx, MTCy, and MTCz) and may be referred to by other names in other embodiments.

According to various embodiments, the MTCx reference point may be used to send control packet information to a network (e.g., a 3GPP PLMN) based on an indication from the MTC server 52. The MTCy reference point may be used to derive routing information for a downlink small data payload by obtaining a network identifier (e.g., 3GPP internal device identifier such as IMSI or Mobile Station International Subscriber Directory Number (MSISDN)) from an MTC device identifier or MTC application identifier. The MTCz reference point may be used for sending a small data payload over a user plane to GGSN/PGW 51.

According to various embodiments, the system architecture 200 may include one or more of the MTCx, MTCy, or MTCz reference points in various combinations. For example, the system architecture 200 may include only the reference points MTCx and MTCy in one embodiment. In another embodiment, the system architecture 200 may include only the reference point MTCz. In other embodiments, the system architecture 200 may include all of the MTCx, MTCy and MTCz reference points. The system architecture 200 may further include Gr/S6a/S6d reference points between the HLR/HSS 56 and the SGSN/MME 58, reference point MTCi between the MTC server 52 and the GGSN/PGW 51, reference point Application Programming Interface (API) between the Application server 26 and the MTC server 52, reference point S1 between the SGSN/MME 58 and the RAN 20, and reference points Um/Uu/LTE-UU between the RAN 20 and the UE 15.

The system architecture 200 may support transmission of small data payloads with little network impact such as signaling overhead, network resources, or delay for reallocation. In some embodiments, the UE 15 may be attached (e.g., by an established Radio Resource Control (RRC) connection) or detached from the RAN 20 before transmission of the small data payload (e.g., when the small data payload transmission is triggered). The UE 15 may be in connected mode or idle mode when the small data payload transmission is triggered in some embodiments. The system architecture 200 (e.g., the MTC-IWF 54) may be configured with a policy that preferentially sends the small data payload over a user plane data path established between the UE 15 and the GGSN/PGW 51 and the MTCz interface when the UE 15 is in connected mode and over a control plane using one of the MTCx or MTCy reference points when the UE 15 is in idle mode. In some embodiments, when the UE 15 is in idle mode, the system architecture 200 may be configured to preferentially send the small data payload over the MTCx reference point.

According to various embodiments, the system architecture 200 may be configured to send the small data payload over one or more of the MTCx, MTCy, or MTCz reference points in various combinations. For example, the system architecture 200 may be configured to only send the small data payload over the reference points MTCx and MTCy in one embodiment. In another embodiment, the system architecture may be configured to only send the small data payload over the reference point MTCz. In other embodiments, the system architecture 200 may be configured to send the small data payload directly over all of the reference points MTCx, MTCy and MTCz. In other embodiments, the system architecture 200 may be configured to only send the small data payload over the reference points MTCz and only one of MTCx or MTCy. The system architecture 200 may be configured to send the small data payload over other reference points than described in other embodiments.

Figure 3A:
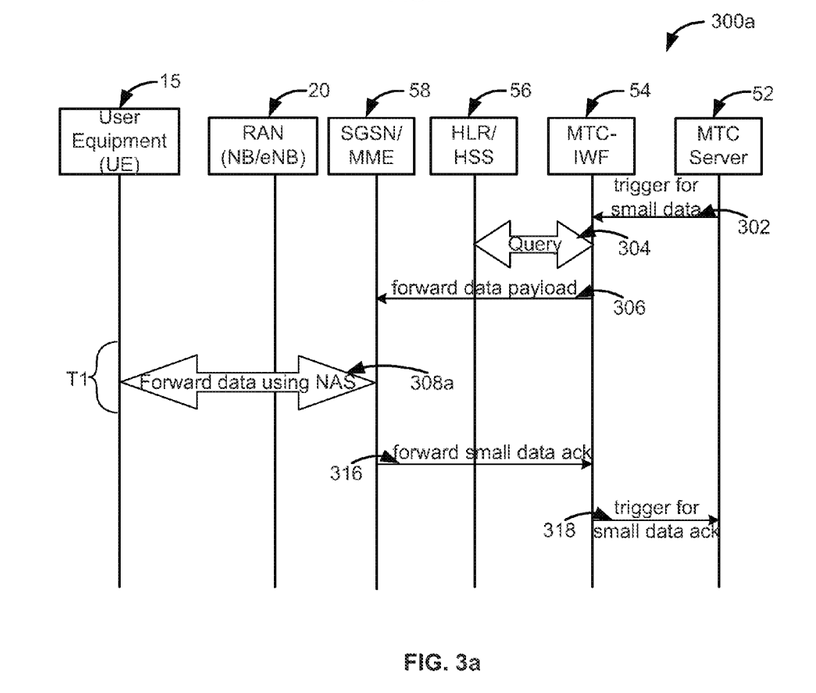
FIGS. 3A-3D schematically illustrate example schemes for transmitting a small data payload, in accordance with some embodiments.

FIG. 3a schematically illustrates an example scheme 300a for transmitting a small data payload, in accordance with some embodiments. The scheme 300a depicts a method for sending a small data payload (e.g., downlink) to the UE 15 over the MTCx reference point according to a first technique, T1.

Referring to FIGS. 2 and 3a, at 302, the MTC server 52 may send a message to the MTC-IWF 54 to trigger transmission of a small data payload. The MTC server 52 may include an MTC device identification (ID) and/or an MTC application (e.g., MTC application 24) ID in the message to indicate a target UE (e.g., UE 15) to receive the small data payload. The MTC server 52 may further include in the message, or otherwise send, the small data payload to the MTC-IWF 54 in some embodiments. In other embodiments, an Application server 26 may directly send the small data payload to the MTC-IWF 54. In some embodiments, a secure connection may be established between the MTC-IWF 54 and the MTC server 52 for transmissions at 302.

At 304, in response to receiving the trigger at 302, the MTC-IWF 54 may Query the HLR/HSS 56 to obtain routing information to deliver the small data payload to the UE 15 over the MTCx reference point. In some embodiments, the MTC-IWF 54 may send the MTC device ID to the HLR/HSS 56, which may have the MTC Device ID as part of an MTC subscription. The HLR/HSS 56 may map the MTC Device ID to an IMSI of the UE 15 and send the IMSI along with an address for the SGSN/MME 58 back to the MTC-IWF 54. A trust relation may be established between the MTC-IWF 54 and the HLR/HSS 56 in some embodiments (e.g., when the MTC-IWF 54 is outside of a domain of an operator of the core network). In response to receiving the query at 304 from the MTC-IWF 54, the HLR/HSS 56 may send to the MTC-IWF 54 IMSI serving node identities and/or other information such as operator policy, authorization information, failure indication with cause value, and the like.

At 306, the MTC-IWF 54 may send the small data payload and a request (e.g., Forward Small Data request) to forward the small data payload, to the SGSN/MME 58 over the MTCx reference point. The MTC-IWF 54 may use the IMSI to send the request and the small data payload to the SGSN/MME 58.

In accordance with the first technique T1 of sending the small data payload from the SGSN/MME 68 to the UE 15, the SGSN/MME 58 may determine that the UE 15 is in a connected state and, at 308a, forward the small data payload to the UE 15 using uplink/downlink (UL/DL) Non-Access Stratum (NAS) signaling. For example, the SGSN/MME 58 may determine that the UE 15 is in a connected state by determining that a context (e.g., locally stored) already exists to indicate a location for the UE 15. The SGSN/MME 58 may send the small data payload to the UE 15 using, for example a downlink Non-Access Stratum (NAS) transport message. An acknowledgement that the small data payload has been sent to the UE 15 may be received by the SGSN/MME 58 during communications at 308a.

At 316, the SGSN/MME 58 may forward to the MTC-IWF 54 the acknowledgement that the small data payload has been sent to the UE 15. At 318, the MTC-IWF 54 may send a trigger to the MTC server 52 to send an acknowledgement that the small data payload has been delivered to the UE 15. The MTC server 52 may, for example, send the acknowledgement to the Application server 26 in response to the trigger.

Figure 3B:
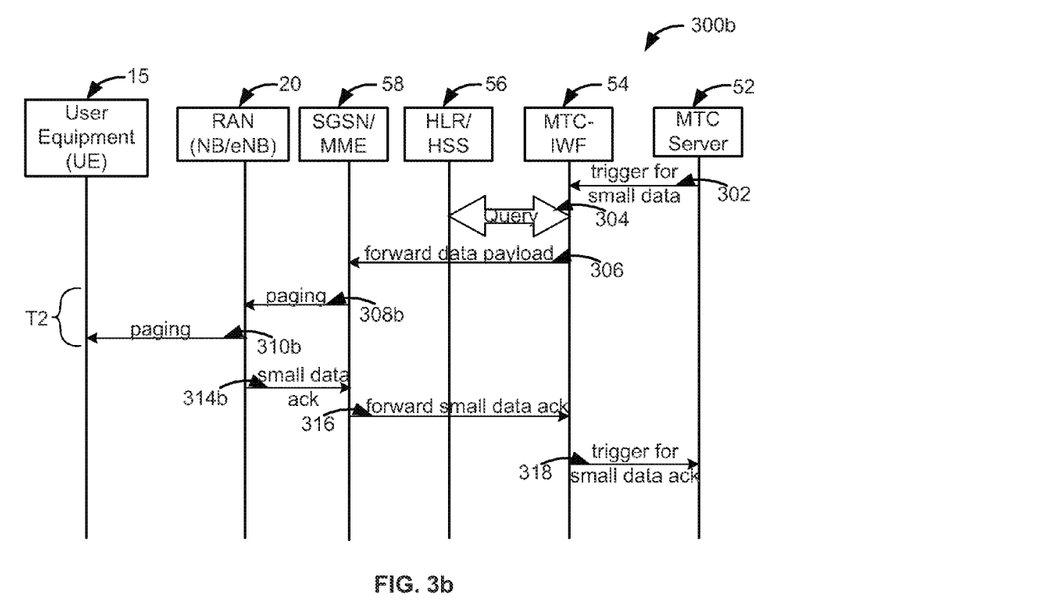

FIG. 3b schematically illustrates an example scheme 300b for transmitting a small data payload, in accordance with some embodiments. The scheme 300b depicts a method for sending a small data payload (e.g., downlink) to the UE 15 over the MTCx reference point according to a second technique, T2. Actions from 302 to 306 and from 316 to 318 of scheme 300b may comport with embodiments described for same numbered actions of scheme 300a.

In accordance with the second technique T2 of sending the small data payload from the SGSN/MME 68 to the UE 15, the SGSN/MME 58 may determine that the UE 15 is in an idle state and, at 308b, may send the small data payload to the RAN 20 (e.g., base station 40 or 42 of FIG. 1) in a paging message. The RAN 20 may send, at 310b, the paging message including the small data payload to the UE 15. For example, the small data payload may be included in a paging message that is broadcasted in a tracking area of a target UE 15 that is in idle mode. The SGSN/MME 58 may be configured to send the paging message including the small data payload over a control plane in some embodiments. In some embodiments, the RAN 20 may inform the SGSN/MME 58 that the small data payload was successfully delivered by sending, at 314b, a small data acknowledgement to the SGSN/MME 58, which may be forwarded to the MTC-IWF 54 at 316.

Figure 3C:
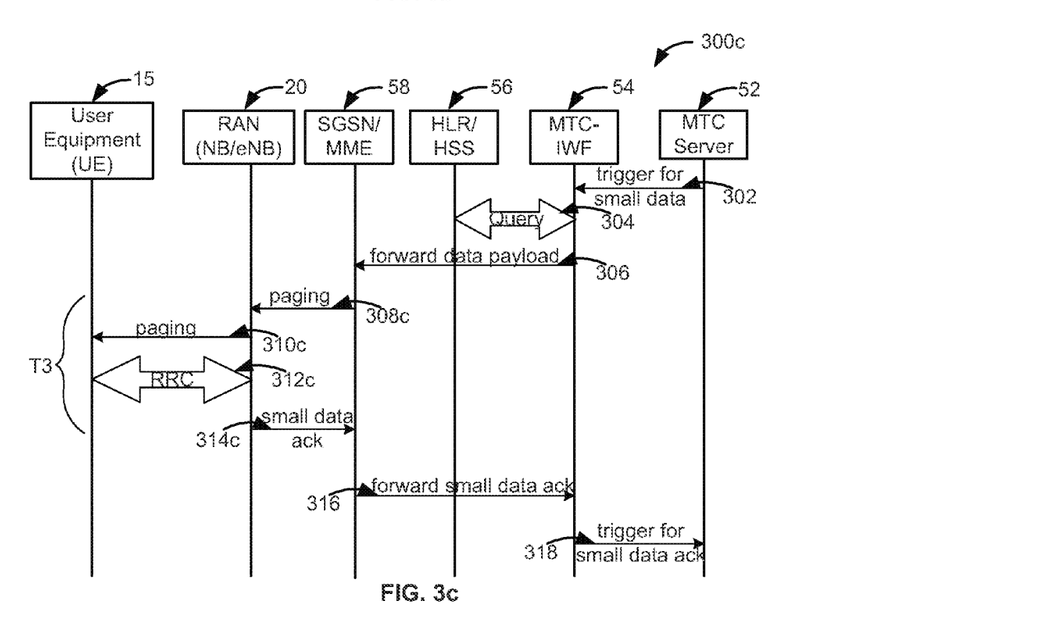

FIG. 3c schematically illustrates an example scheme 300c for transmitting a small data payload, in accordance with some embodiments. The scheme 300c depicts a method for sending a small data payload (e.g., downlink) to the UE 15 over the MTCx reference point according to a third technique, T3. Actions from 302 to 306 and from 316 to 318 of scheme 300c may comport with embodiments described for same numbered actions of scheme 300a.

In accordance with the third technique T3 of sending the small data payload from the SGSN/MME 68 to the UE 15, the SGSN/MME 58 may determine that the UE 15 is in an idle state and, at 308c, may send a paging message including the small data payload to the RAN 20 (e.g., base station 40 or 42 of FIG. 1). The paging message may further include an optional small data indicator to indicate that the small data payload is at the RAN 20 (e.g., at base station 40 or 42 of FIG. 1). In some embodiments, the SGSN/MME 58 may send the small data payload over the S1 reference point to RAN 20.

In some embodiments, the RAN 20 may retrieve and/or store the small data payload from the paging message and send, at 310c, a paging message to the UE 15 without the small data payload. The RAN 20 may include the small data indicator with the paging message. In some embodiments where the small data payload is at the RAN 20 prior to the UE 15 being attached to the RAN 20 (e.g., by RRC connection), the UE 15 may receive the paging message sent at 310c with the small data indicator indicating that the small data payload is at the RAN 20.

At 312c, the UE 15 may begin an attachment process to the RAN 20 by, e.g., establishment of an RRC connection. For example, the establishment of the RRC connection may be requested by the UE 15 in an RRC connection request message to the RAN 20 in response to the paging message at 310c. The RAN 20 may deliver the small data payload to the UE 15 via signals associated with the RRC connection setup procedure. When the UE 15 receives the small data payload, the UE 15 may terminate the RRC connection setup procedure and may return to an idle mode if no other data is to be sent or received by the UE 15. In some embodiments, the RAN 20 may inform the SGSN/MME 58 that the small data payload was successfully delivered by sending, at 314c, a small data acknowledgement to the SGSN/MME 58.

Figure 3D:
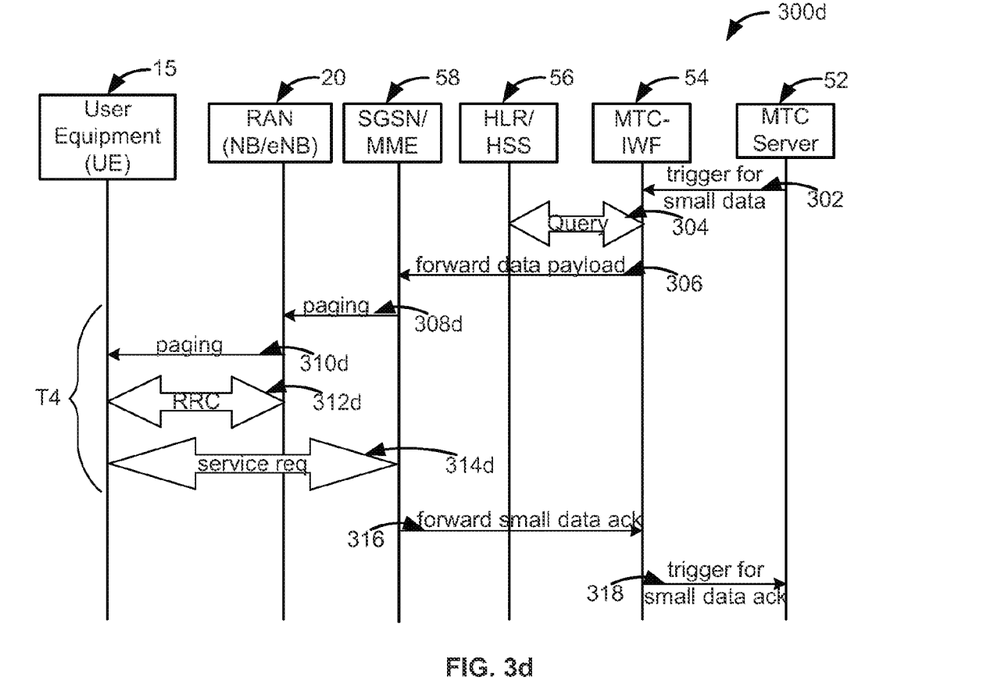

FIG. 3d schematically illustrates an example scheme 300d for transmitting a small data payload, in accordance with some embodiments. The scheme 300d depicts a method for sending a small data payload (e.g., downlink) to the UE 15 over the MTCx reference point according to a fourth technique, T4. Actions from 302 to 306 and from 316 to 318 of scheme 300d may comport with embodiments described for same numbered actions of scheme 300a.

In accordance with the fourth technique T4 of sending the small data payload from the SGSN/MME 68 to the UE 15, the SGSN/MME 58 may determine that the UE 15 is in an idle state and, at 308d, may send a paging message that may include a small data indicator that indicates a presence of the small data payload at the SGSN/MME 58 that needs to be delivered or forwarded to the UE 15. At 310d, the RAN 20 may send the paging message, which may include the small data indicator to the UE 15 to indicate that the small data payload targeted for the UE 15 is at the SGSN/MME 58. In some embodiments where the small data payload is at the SGSN/MME 58 prior to the UE 15 being attached to the RAN 20 (e.g., by RRC connection), the UE 15 may receive the paging message sent at 310d with the small data indicator indicating that the small data payload is at the SGSN/MME 58. In response to the paging message at 310d, the UE 15, at 312d, may begin an attachment process to the RAN 20 by, e.g., establishment of an RRC connection and, at 314d, begin an attachment process with the SGSN/MME 58 by sending a Non-Access Stratum (NAS) message such as an attach/service request message to the RAN 20. The RAN 20 may forward the NAS message to the SGSN/MME 58. During the attachment process at 314d, the SGSN/MME 58 may send the small data payload to the UE 15 using Non-Access Stratum (NAS) signaling e.g. attach response, service request response, DL NAS transport message, etc.

The content of the NAS message sent by the UE 15 to begin the attachment process at 314d may depend on the content of the paging message received by the UE 15 at 310d. For example, in a case where the paging message at 310 contains only the small data indicator indicating that the small data payload is at the SGSN/MME 58, the UE 15 may include an information element including a Key Set Identifier (KSI), which may be associated with cipher and integrity keys, and a sequence number, which may be a counter value for the UE 15, in the NAS message. The MME of the SGSN/MME 58 may use the KSI, the sequence number and a Temporary Mobile Subscriber Identity (TMSI) value such as an S-TMSI, where the S refers to System Architecture Evolution (SAE), to encrypt the small data payload for delivery to the UE 15. When the UE 15 receives the small data payload, the UE 15 may terminate the attachment process and may be configured to return to an idle mode if no other data is to be sent or received by the UE 15.

In some embodiments where the paging message sent at 310d includes the small data payload (e.g., at 310b of FIG. 3b), the UE 15 may or may not be required by network operator policy to send a response message to the small data payload from the MTC server 52. In a case where network operator policy does not require sending of any response, the UE 15 may be configured to include an information element including an acknowledgement such as an MTC data acknowledgement in the NAS message that is sent to begin the attachment process at 314d. In a case where network operator policy requires sending of a response, the UE 15 may include an information element including the KSI and sequence number and an encrypted response payload as a NAS Packet Data Unit (PDU) in a NAS container in the NAS message that is sent to begin the attachment process at 314d. If the UE 15 has multiple response messages or more data to fit in the NAS container at 314d, the UE 15 may indicate in the NAS container that more data is to follow. After the attach/service request message has been sent by the UE 15 to begin the attachment process at 314d, the UE 15 may include the additional data in a NAS PDU in an uplink information transfer message to the SGSN/MME 58. In some embodiments, if the UE 15 has an uplink small data payload to send to the MTC server 52, the UE 15 may activate Packet Data Protocol (PDP) Context and/or PDP bearers and send uplink data on a user plane (e.g., via GGSN/PGW 51 of FIG. 2).

In embodiments where the NAS message (e.g., of attachment process at 314d) sent by the UE 15 to the SGSN/MME 58 includes only the KSI and the sequence number (e.g., a case where the paging message at 310d contains only the small data indicator indicating that the small data payload is at the SGSN/MME 58), the SGSN/MME 58 may send the small data payload in an encrypted information element in a NAS message such as, for example, an encrypted information element in a NAS PDU in an S1 downlink NAS transport message to the UE 15. The UE 15 may send a response message or an acknowledgement in response to the NAS message with the small data payload. The acknowledgement may include, for example, an acknowledgement in an encrypted information element in a NAS PDU in an uplink information transfer message. The UE 15 may further include in the response message or acknowledgement, an information element in the uplink information transfer message to request the release of the RRC connection at 312d if the UE 15 does not have further data to send.

In some embodiments, if the NAS message (e.g., attach/service request message) that is sent to begin the attachment process at 314d includes the information element including an acknowledgement such as an MTC data acknowledgement (e.g., a case where network operator policy does not require sending of a response to reception by the UE 15 of the small data payload), the SGSN/MME 58 may send or forward the data acknowledgement to the MTC-IWF 54 at 316d. If the NAS message (e.g., attach/service request message) that is sent to begin the attachment process at 314d includes an information element including the KSI and sequence number and an encrypted response payload as a NAS Packet Data Unit (PDU) in a NAS container (e.g., a case where network operator policy requires sending of a response to indicate reception by the UE 15 of the small data payload), the SGSN/MME 58 may decrypt the NAS PDU and forward, at 316d, the response payload to the MTC-IWF 54. The SGSN/MME 58 may also send an acknowledgement in an encrypted information element in a NAS PDU in an S1 downlink NAS transport message to the UE 15.

In some embodiments, the S1 downlink NAS transport message may include an information element that allows the MME of the SGSN/MME 58 to request the base station of the RAN 20 to release the RRC connection at 312d. The MME may not use this indication if the UE 15 previously indicated that multiple response messages are to be transferred.

Figure 4:
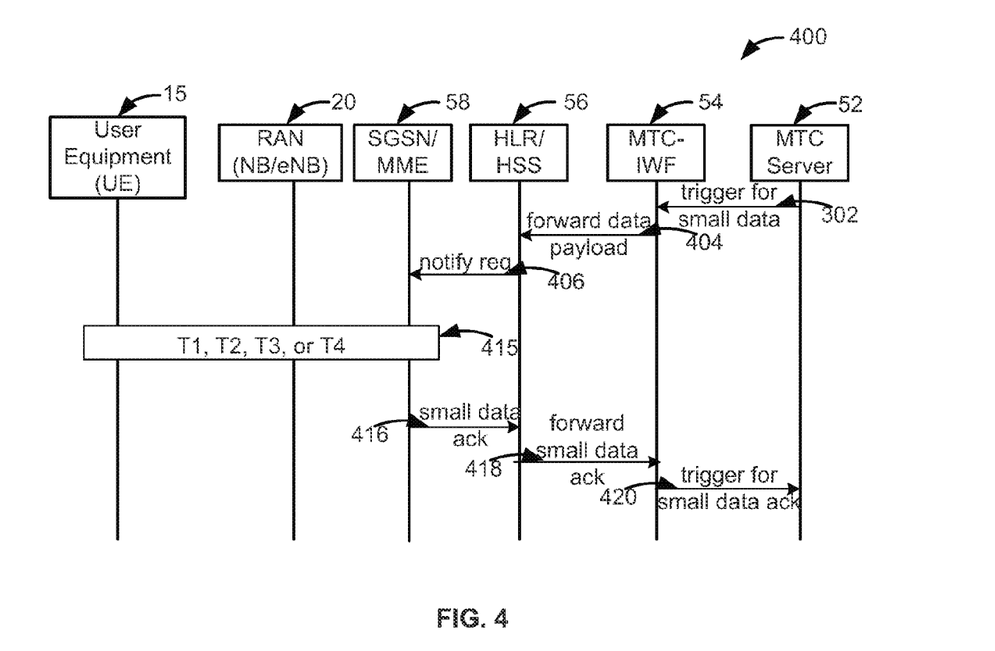
FIG. 4 schematically illustrates another example scheme for transmitting a small data payload, in accordance with some embodiments.

FIG. 4 schematically illustrates another example scheme 400 for transmitting a small data payload, in accordance with some embodiments. The scheme 400 depicts a method for sending a small data payload (e.g., downlink) to the UE 15 over the MTCy reference point. The scheme 400 may comport with embodiments described in connection with schemes 300a-d of FIGS. 3a-3d except where otherwise indicated. For example, the small data payload may be sent, at 415, from the SGSN/MME 58 to the UE 15 according to the first, second, third, or fourth techniques (e.g., T1, T2, T3, or T4) as described in connection with FIGS. 3a-3d.

Referring to FIGS. 2 and 4, at 302, the MTC server 52 may send a message to the MTC-IWF 54 to trigger transmission of a small data payload. The action at 302 may comport with embodiments described in connection with 302 of FIG. 3a. At 404, the MTC-IWF 54 may send the small data payload and a request (e.g., Forward Small Data request) to forward the small data payload, to the HLR/HSS 56 over the MTCy reference point. The MTC-IWF 54 may use MTC device identification (ID) and/or an MTC application ID (ID of MTC Application 24) in the message to indicate a target UE (e.g., UE 15) to the HLR/HSS 56. A trust relation may be established between the MTC-IWF 54 and the HLR/HSS 56 in some embodiments (e.g., when the MTC-IWF 54 is outside of a domain of an operator of the core network).

The HLR/HSS 56 may have the MTC device ID as part of an MTC subscription. The HLR/HSS 56 may be configured to map the MTC device ID to an IMSI of the UE 15 and derive the target SGSN/MME 58. At 406, the HLR/HSS 56 may send the small data payload to the SGSN/MME 58 (e.g., over the reference points Gr/S6a/S6d of FIG. 2). The small data payload may be sent, for example, in a notify request message.

At 415, the SGSN/MME 58 may send the small data payload to the UE 15. At 416, the SGSN/MME 58 may send or forward a response or acknowledgement as described in connection with FIGS. 3a-3d to the HLR/HSS 56. At 418, the HLR/HSS 56 may forward the response or acknowledgement to the MTC-IWF 54 over the MTCy reference point.

At 420, the MTC-IWF 54 may send a trigger to the MTC server 52 to send an acknowledgement that the small data payload has been delivered to the UE 15. The MTC server 52 may, for example, send the acknowledgement to the Application server 26. According to various embodiments, techniques described in connection with FIGS. 3a-3d and FIG. 4 may be combined. For example, the small data payload may be sent over the MTCx reference point and the acknowledgement may be received over the MTCy reference point or vice versa.

Figure 5:
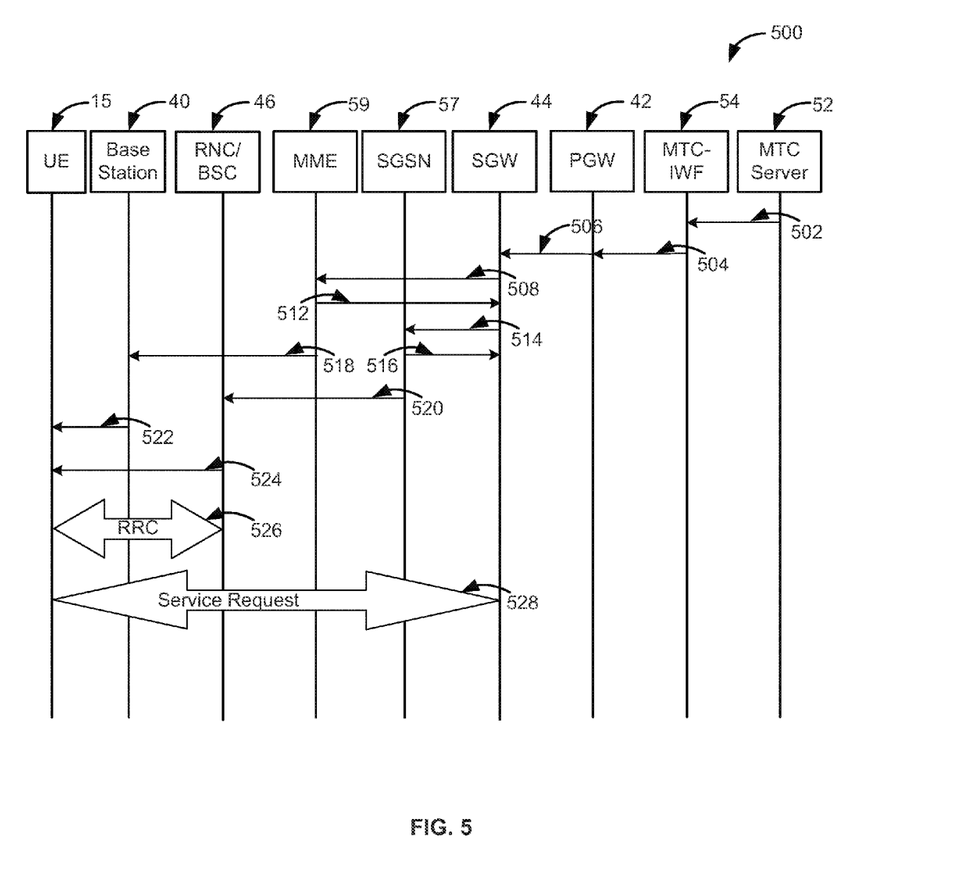
FIG. 5 schematically illustrates yet another example scheme for transmitting a small data payload, in accordance with some embodiments.

FIG. 5 schematically illustrates yet another example scheme 500 for transmitting a small data payload, in accordance with some embodiments. The scheme 500 depicts a method for sending a small data payload (e.g., downlink) to the UE 15 over the MTCz reference point. The scheme 500 is described in connection with a Long Term Evolution/Evolved Packet Core (LTE/EPC) system, however, similar concepts may apply to other systems.

The MTC server 52 may receive a trigger to send a small data payload as described in connection with scheme 300a of FIG. 3a. At 502, in response to receiving the trigger, the MTC server 52 may send the small data payload, at 504, to PGW 42 (e.g., PGW of the GGSN/PGW 51 of FIG. 2) over the MTCz reference point. At 506, the PGW 42 may send the small data payload to a serving gateway (SGW) over an established default bearer.

At 508, the SGW 44 may send a downlink data notification message to the MME 59 and/or at 514, the SGW 44 may send a downlink notification message to the SGSN 57. At 512 the MME 59 may respond with a downlink data notification acknowledgement message and/or at 516, the SGSN 57 may respond with a downlink data notification acknowledgement message.

At 518, the MME may send a paging message to the base station if the UE 15 is registered in the MME. At 520, the SGSN 57 may send a paging message to a Radio Network Controller/Base Station Controller (RNC/BSC) 46 if the UE is registered in the SGSN 57. At 522, the base station 40 may send a paging message to the UE 15 and/or at 524, the RNC/BSC 46 may send a paging message to the UE 15. The paging messages may indicate to the UE 15 that a downlink small data payload is to be sent to the UE 15.

At 526, in response to the paging message(s) the UE 15 may perform an attachment process to establish an RRC connection with the base station 40 and/or RNC/BSC 46 (e.g., RAN 20 of FIG. 3a). At 528, the UE 15 may perform an attachment process (e.g., a service request procedure) to establish a connection with the MME 59, SGSN 57 and/or SGW 44. The SGW 44 may transmit the small data payload to the UE 15 via Radio Access Technology (RAT), which may be the RAT used to perform the attachment process at 528. According to various embodiments, the RRC connection at 526 may comport with embodiments described in connection with action 312c of FIG. 3c and the attachment process at 528 may comport with embodiments described in connection with action 314d of FIG. 3d.

Figure 6:
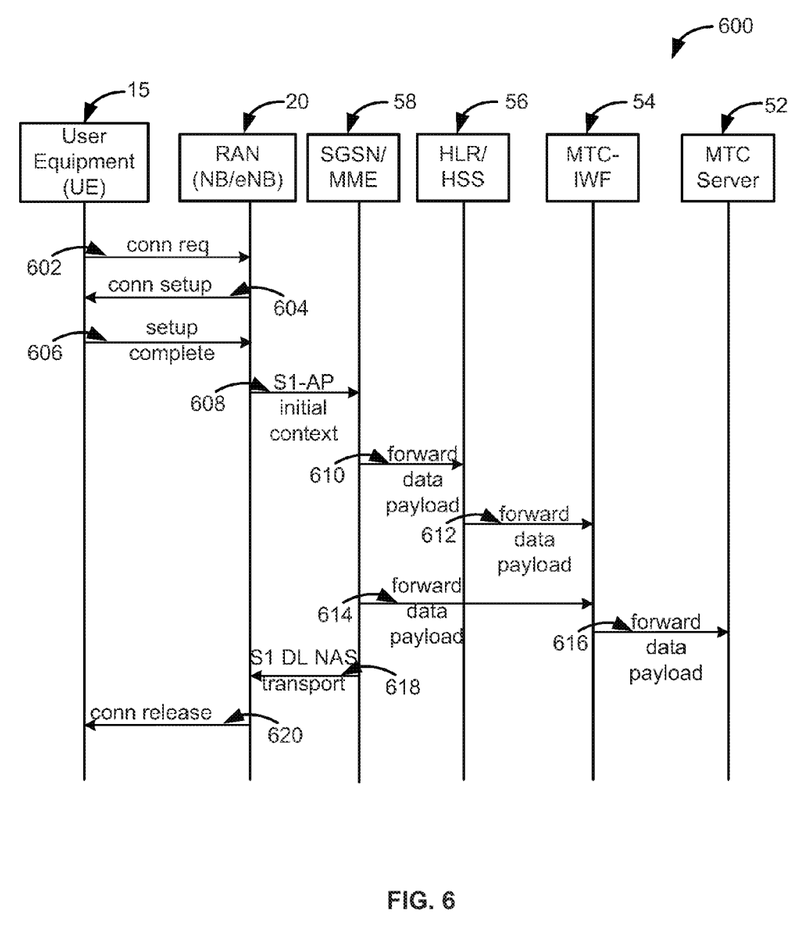
FIG. 6 schematically illustrates still yet another example scheme for transmitting a small data payload, in accordance with some embodiments.

FIG. 6 schematically illustrates still yet another example scheme 600 for transmitting a small data payload, in accordance with some embodiments. The scheme 600 depicts a method for sending a small data payload (e.g., uplink) from the UE 15 to the MTC server 52 over the MTCx or MTCy reference points.

Referring to FIGS. 2 and 6, the UE 15 may be triggered by the MTC application 24 to send a small data payload to the MTC server 52. At 602, in response to the trigger, the UE 15 may send a connection request message to RAN 20. The UE 15 may include a NAS module and an Access Stratum (AS) module. In some embodiments, the NAS module may be configured to request the AS module to establish, for example, an RRC connection including a TMSI (e.g., S-TMSI) of the UE 15 in the connection request message resulting in the action at 602. The UE 15 may include a value that indicates to a base station of RAN 20 that a short-lived signaling procedure is in progress. For example, the UE 15 may set a cause value in the connection request message to "mo-Signaling." Such action may reduce a likelihood that the MME of SGSN/MME 58 will download a security context to the base station. Without the security context, handover may not be performed. Radio resources can be saved if the base station does not configure the UE 15 to perform measurement reporting.

At 604, the base station of the RAN 20 may send an RRC connection setup message to indicate establishment of the RRC connection. At 606, in response to receiving the RRC connection setup message, the UE 15 may send the small data payload to the base station as part of an RRC setup complete message. The RRC setup complete message may include, for example, a KSI and sequence number and the small data payload in encrypted form. The small data payload may be sent as a NAS PDU in a NAS container in some embodiments.

At 608, the base station may forward the encrypted small data payload (e.g., in the NAS container) to the MME of the SGSN/MME 58 in an S1 Application Protocol (S1-AP) initial context message. The MME may be configured to decrypt the small data payload and add identity information of the UE 15 to a message that includes the small data payload to the MTC-IWF 54.

The SGSN/MME 58 may be configured to forward the small data payload to the MTC/IWF 54 over the MTCx or MTCy reference points. In one embodiment, at 610, the SGSN/MME 58 may forward the small data payload to the HLR/HSS 56 (e.g., over Gr/S6a/S6d reference points of) and, at 612, the HLR/HSS may forward the small data payload to the MTC-IWF 54 over the MTCy reference. In another embodiment, at 614, the SGSN/MME 58 may be configured to forward the small data payload to the MTC-IWF 54 directly over the MTCx reference point.

At 616, the MTC-IWF 54 may forward the small data payload to the MTC server 52 (e.g., over the MTCsp reference point). The MTC server 52 may further forward the small data payload to an Application server 26.

At 618, the SGSN/MME 58 may send an acknowledgement that the small data payload has been received by the SGSN/MME 58 or forwarded to the MTC-IWF 54. The acknowledgement may be in a message that includes an MTC data acknowledgement information element in an encrypted NAS PDU to the base station in an S1 downlink NAS transport message. In some embodiments, the message may further include an information element that allows the MME of the SGSN/MME 58 to request the base station of the RAN 20 to release the RRC connection.

At 620, the base station of the RAN 20 may send the acknowledgement message to the UE 15 and release the RRC connection in an RRC connection release message. The base station may include an MTC data acknowledgement information element as a NAS PDU within the RRC connection release message.

In some embodiments, the UE 15 may perform NAS signaling instead of actions at 602-606 such as, for example, a tracking area update, service request, attach request, and the like and include the uplink small data payload to the SGSN/MME 58 using NAS signaling. In some embodiments, the UE 15 may perform RRC signaling to include the uplink small data payload to the RAN 20, which may forward the small data payload to the SGSN/MME 58 using S1. S1 may be shared and not on a per UE basis.

In other embodiments, the UE 15 may send an uplink small data payload to the MTC server 52 over a user plane (e.g., over the MTCz reference point). For example, the UE 15 may establish a connection (e.g., a User Path (UP) connection) with the MTC server 52 and send the small data payload on a user plane directly to the MTC server 52 (e.g., over reference point MTCi).

Figure 7:
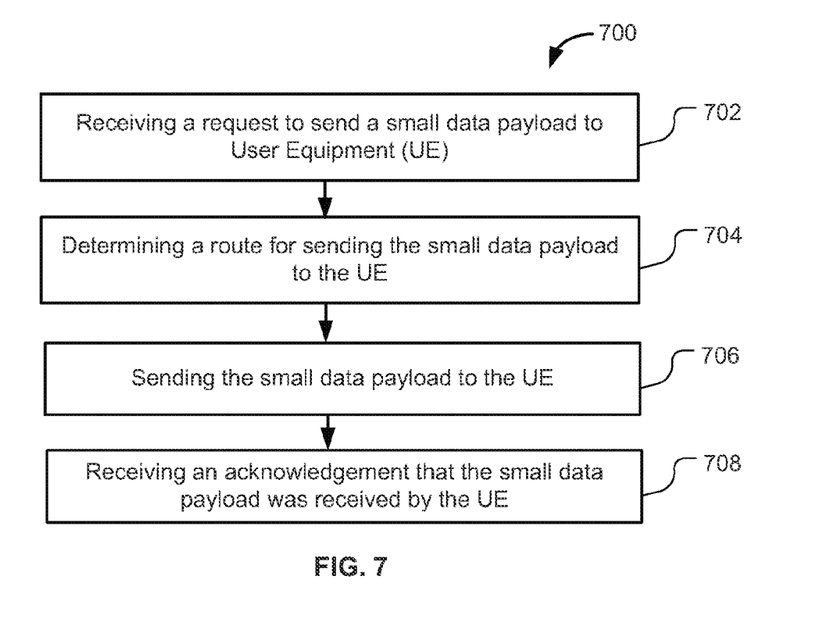
FIG. 7 is a flow diagram of a method for sending a small data payload in a BWA network, in accordance with some embodiments.

FIG. 7 is a flow diagram of a method 700 for sending a small data payload in a BWA network (e.g., BWA network 100 of FIG. 1), in accordance with some embodiments. The method 700 may comport with embodiments already described in connection with FIGS. 1-6.

Referring to FIGS. 2 and 7, at 702, the method 700 includes receiving a request to send a small data payload to User Equipment (UE) 15. For example, the MTC-IWF 54 may receive a trigger from the MTC server 52 to request the sending of the small data payload.

At 704, the method 700 may further include determining a route for sending the small data payload to the UE 15. A module such as the MTC-IWF 54 in the core network 25 may be configured to determine the route by determining whether the UE 15 is in connected or idle mode. For example, the MTC-IWF 54 may query the HLR/HSS 56 or the SGSN/MME 58 to determine whether a context is present for the UE 15 to determine whether the UE 15 is connected with the SGSN/MME 58 or idle. If the UE 15 is in idle mode, the MTC-IWF 54 may be routed over one of the MTCx or MTCy reference points. If the UE 15 is in connected mode, the MTC-IWF 54 may be routed over the MTCz reference point.

In some embodiments, the MTC-IWF 54 may query the HLR/HSS 56 or SGSN/MME 58 to determine a network operator policy and route the information over the MTCx, MTCy, or MTCz reference points according to the network operator policy.

In some embodiments, the MTC-IWF 54 may determine the route by attempting to send the small data payload over the MTCz reference point. If the attempt to send over the MTCz reference point fails for any reason, the MTC-IWF 54 may attempt to send the small data payload over the MTCx and/or MTCy reference points. For example, if sending by the MTC-IWF over the MTCz reference point to a Packet Data Network Gateway (PGW) fails, the MTC-IWF 54 may attempt to send the small data payload over the MTCx reference point. If sending by the MTC-IWF over the MTCx reference point fails, the MTC-IWF 54 may attempt to send the small data payload over the MTCy reference point.

In some embodiments, the MTC-IWF 54 may determine a route by determining whether a data path is established between the UE 15 and the PGW of GGSN/PGW 51. If it is determined that the data path is established, then the MTC-IWF 54 may route the small data payload over the MTCz reference point, else, the MTC-IWF 54 may route the small data payload over one of the MTCx or MTCy reference points. Combinations of these techniques may be used to determine a route for sending the small data payload to the UE 15.

At 706, the method 700 may further include sending the small data payload to the UE 15. The small data payload may be sent, for example, using the techniques described in connection with FIGS. 3-5.

At 708, the method 700 may further include receiving an acknowledgement that the small data payload was received by the UE 15. The acknowledgement may comport with techniques described in connection with FIGS. 3-5.

Figure 8:
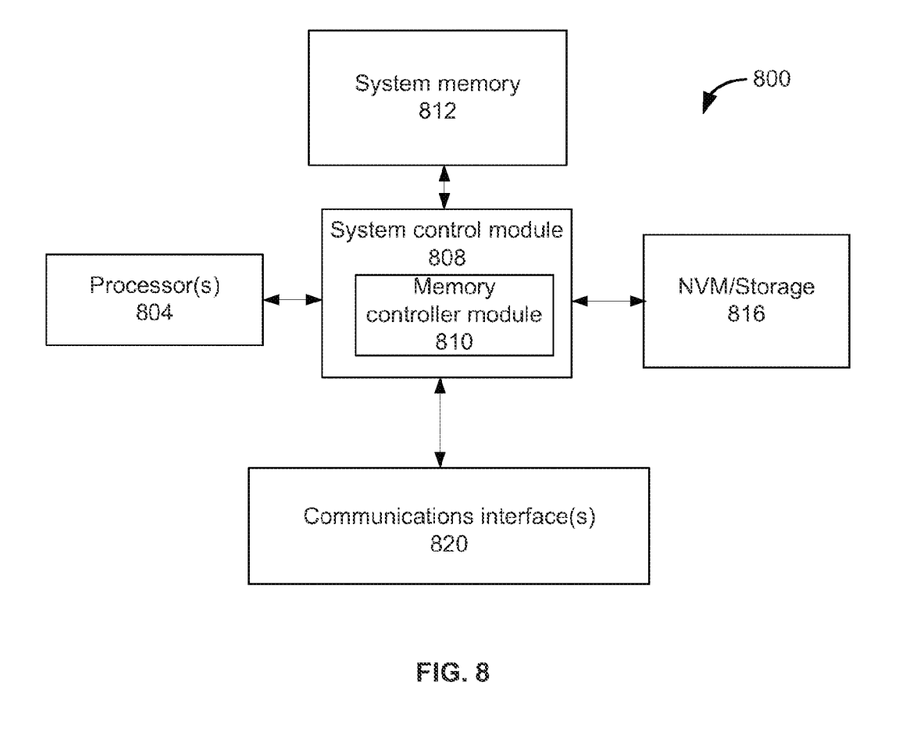
FIG. 8 schematically illustrates an example system that may be used to practice various embodiments described herein.

Embodiments of the present disclosure may be implemented into a system using any suitable hardware and/or software to configure as desired. FIG. 8 schematically illustrates an example system 800 that may be used to practice various embodiments described herein. FIG. 8 illustrates, for one embodiment, an example system 800 having one or more processor(s) 804, system control module 808 coupled to at least one of the processor(s) 804, system memory 812 coupled to system control module 808, non-volatile memory (NVM)/storage 816 coupled to system control module 808, and one or more communications interface(s) 820 coupled to system control module 808.

In some embodiments, the system 800 may be capable of functioning as the UE 15 as described herein. In some embodiments, a system control module 808 of the UE 15 may include a NAS module and an AS module as described herein. In other embodiments, the system 800 may be capable of functioning as the one or more servers 50 of FIG. 1 or otherwise provide logic/module that performs functions as described for a base station 40, one or more nodes, MTC Server 52, MTC-IWF 54, HLR/HSS 56, SGSN/MME 58, RAN 20, PGW 42, and other modules described herein. In some embodiments, the system 800 may include one or more computer-readable media (e.g., system memory or NVM/storage 816) having instructions and one or more processors (e.g., processor(s) 804) coupled with the one or more computer-readable media and configured to execute the instructions to implement a module (e.g., an interworking function) to perform actions described herein.

System control module 808 for one embodiment may include any suitable interface controllers to provide for any suitable interface to at least one of the processor(s) 804 and/or to any suitable device or component in communication with system control module 808.

System control module 808 may include memory controller module 810 to provide an interface to system memory 812.

The memory controller module 810 may be a hardware module, a software module, and/or a firmware module.

System memory 812 may be used to load and store data and/or instructions, for example, for system 800. System memory 812 for one embodiment may include any suitable volatile memory, such as suitable DRAM, for example. In some embodiments, the system memory 812 may include double data rate type four synchronous dynamic random-access memory (DDR4 SDRAM).

System control module 808 for one embodiment may include one or more input/output (I/O) controller(s) to provide an interface to NVM/storage 816 and communications interface(s) 820.

The NVM/storage 816 may be used to store data and/or instructions, for example. NVM/storage 816 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 816 may include a storage resource physically part of a device on which the system 800 is installed or it may be accessible by, but not necessarily a part of, the device. For example, the NVM/storage 816 may be accessed over a network via the communications interface(s) 820.

Communications interface(s) 820 may provide an interface for system 800 to communicate over one or more network(s) and/or with any other suitable device. The system 800 may wirelessly communicate with the one or more components of the wireless network in accordance with any of one or more wireless network standards and/or protocols.

For one embodiment, at least one of the processor(s) 804 may be packaged together with logic for one or more controller(s) of system control module 808, e.g., memory controller module 810. For one embodiment, at least one of the processor(s) 804 may be packaged together with logic for one or more controllers of system control module 808 to form a System in Package (SiP). For one embodiment, at least one of the processor(s) 804 may be integrated on the same die with logic for one or more controller(s) of system control module 808. For one embodiment, at least one of the processor(s) 804 may be integrated on the same die with logic for one or more controller(s) of system control module 808 to form a System on Chip (SoC).

In various embodiments, the system 800 may be, but is not limited to, a server, a workstation, a desktop computing device, or a mobile computing device (e.g., a laptop computing device, a handheld computing device, a tablet, a netbook, etc.). In various embodiments, the system 800 may have more or less components, and/or different architectures. For example, in some embodiments, the system 800 includes one or more of a camera, a keyboard, liquid crystal display (LCD) screen (including touch screen displays), non-volatile memory port, multiple antennas, graphics chip, application-specific integrated circuit (ASIC), and speakers.

According to various embodiments, the present disclosure describes a system comprising one or more computer-readable media having instructions and one or more processors coupled with the one or more computer-readable media and configured to execute the instructions to implement an interworking function (IWF) to receive, from a machine type communication (MTC) server, a trigger to send a data payload to a user equipment (UE) over a wireless communication network, the data payload being smaller than a preconfigured threshold and send, over a first reference point to a first module including a Mobility Management Entity (MME) or a Serving GPRS (General Packet Radio Service) Support Node (SGSN) or a second reference point to a second module including a Home Location Register (HLR) or a Home Subscriber Server (HSS), the data payload and a request to forward the data payload to the UE. In some embodiments, the IWF is configured to send the data payload and the request to forward the data payload over the first reference point to the first module and in response to receiving the trigger from the MTC server, communicate with the first module to obtain routing information for sending the data payload to the UE over the first reference point.

In some embodiments, the IWF is configured to send the data payload and the request to forward the data payload over the second reference point to the second module. In some embodiments, the IWF comprises a machine type communication interworking function (MTC-IWF) that is configured to terminate a reference point to the MTC-IWF from the MTC server. In some embodiments, the MTC-IWF is configured to authenticate the MTC server and authorize control plane requests from the MTC server and to relay or translate signaling protocols received over the reference point to the MTC-IWF from the MTC server. In some embodiments, the first module and the second module are each configured to send the data payload to the UE over a control plane of the wireless communication network. In some embodiments, the IWF is configured to send, over a third reference point to a third module including a Packet Data Network Gateway (PGW), the data payload and the third module is configured to send the data payload to the UE over a user plane of the wireless communication network. In some embodiments, the IWF is configured to send the data payload using the third reference point if the UE is in connected mode and send the data payload using the first reference point or the second reference point if the UE is in idle or connected mode. In some embodiments, the wireless communication network includes a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network and the wireless communication network is accessible by a GSM Enhanced Data for GSM Evolution (EDGE) Radio Access Network (GERAN), Universal Terrestrial Radio Access Network (UTRAN) or Evolved UTRAN (E-UTRAN).

According to various embodiments, the present disclosure further describes a system comprising an interworking function (IWF) configured to receive, from a machine type communication (MTC) server, a trigger to send an MTC data payload to a user equipment (UE) over a wireless communication network and a module including a Mobility Management Entity (MME) or a Serving GPRS (General Packet Radio Service) Support Node (SGSN) coupled with the IWF over a reference point that terminates at the IWF, wherein the IWF is further configured to send, over the reference point to the module, the MTC data payload and a request to forward the MTC data payload to the UE. In some embodiments, the module is configured to send, to a base station of the wireless communication network, a paging message that includes a small data indicator that indicates a location of the MTC data payload and/or the MTC data payload to be forwarded to the UE.

In some embodiments, the module is configured to send a paging message that includes the MTC data payload to the base station and the base station is configured to send the paging message including the MTC data payload to the UE. In some embodiments, the module is configured to send a paging message that includes the small data indicator and the MTC data payload to the base station and the base station is configured to send the paging message including the small data indicator to the UE, the small data indicator indicating that the MTC data payload is at the base station, the base station being further configured to send the MTC data payload over a Radio Resource Control (RRC) connection established between the base station and the UE. In some embodiments, the module is configured to send a paging message that includes the small data indicator to the base station, the small data indicator indicating that the MTC data payload is at the module. In some embodiments, the base station is configured to send the paging message including the small data indicator to the UE. In some embodiments, the module is configured to send, to the UE, the MTC data payload in response to a non-access stratum (NAS) message sent by the UE, the NAS message being sent by the UE in response to the paging message.

According to various embodiments, the present disclosure further describes a method comprising receiving, by a machine type communication interworking function (MTC-IWF) from a machine type communication (MTC) server, a trigger to send a data payload, which is smaller than a preconfigured threshold, to a user equipment (UE) over a wireless communication network and sending, by the MTC-IWF over a reference point to a Packet Data Network Gateway (PGW), the data payload. In some embodiments, the PGW is configured to send the data payload to the UE over a user plane of the wireless communication network. In some embodiments, the method further includes sending, by the PGW, the data payload to a serving gateway (SGW) of the wireless communication network.

In some embodiments, the method further includes sending, by the SGW, the data payload to the UE over a user plane. In some embodiments, the reference point is a third reference point. In some embodiments, the method further includes, if sending by the MTC-IWF over a reference point to a Packet Data Network Gateway (PGW), the data payload fails, then sending, by the MTC-IWF over a first reference point to a first module including a Mobility Management Entity (MME) or a Serving GPRS (General Packet Radio Service) Support Node (SGSN) or a second reference point to a second module including a Home Location Register (HLR) or a Home Subscriber Server (HSS), the data payload and a request to forward the data payload to the UE. In some embodiments, the first module or the second module is configured to send the data payload to the UE over a control plane of the wireless communication network.

According to various embodiments, the present disclosure describes an apparatus comprising an antenna, a processor configured to communicate with a base station of a wireless communication network via the antenna, and a control module configured to establish a wireless connection with the base station of the wireless communication network and send, over the wireless connection, a Machine Type Communication (MTC) data payload to the base station for forwarding of the MTC data payload to a module including a Mobility Management Entity (MME) or a Serving GPRS (General Packet Radio Service) Support Node (SGSN) that is configured to forward the MTC data payload over an interface to a machine type communication interworking function (MTC-IWF), the MTC-IWF being configured to forward the MTC data payload to an MTC server. In some embodiments, the control module further includes a Non-Access Stratum (NAS) module and an Access Stratum (AS) module. In some embodiments, the control module is further configured to establish a connection with the base station by requesting, by the NAS module, the AS module to send a Radio Resource Control (RRC) connection request message with a Temporary Mobile Subscriber Identity (TMSI) to the base station.

In some embodiments, the RRC connection request message includes a value that indicates to the base station that a short-lived signaling procedure is in progress. In some embodiments, the control module is further configured to send the MTC data payload to the base station as part of an RRC setup complete message that is sent in response to an RRC connection setup message received from the base station. In some embodiments, the RRC connection setup complete message includes an information element including a Key Set Identifier (KSI) and sequence number and the MTC data payload in encrypted form, the MTC data payload being sent as a NAS Packet Data Unit (PDU) in a NAS container. In some embodiments, the base station is configured to forward the MTC data payload to the module in an S1 Application Protocol (S1-AP) initial context message. In some embodiments, the module is configured to decrypt the MTC data payload and add identity information of the apparatus to a message that includes the MTC data payload to the MTC-IWF.

In some embodiments, the control module is further configured to receive an acknowledgement that the MTC data payload has been received by the module. In some embodiments, the wireless connection with the base station is a Radio Resource Control (RRC) connection. In some embodiments, the module is configured to send the acknowledgement to the base station in an encrypted Non-Access Stratum (NAS) Packet Data Unit (PDU) in an S1 downlink NAS transport message. In some embodiments, the base station is configured to forward the acknowledgement to the apparatus in a Non-Access Stratum (NAS) Packet Data Unit (PDU) within a Radio Resource Control (RRC) connection release message that releases the RRC connection between the apparatus and the base station. In some embodiments, the S1 downlink NAS Transport message further includes a request by the module to the base station to release the RRC connection. In some embodiments, the wireless communication network is an Internet Protocol (IP) based network and the apparatus is a user equipment (UE) comprising one of a laptop computing device, a handheld computing device, a tablet, or a netbook. In some embodiments, the apparatus further includes one or more of a camera, a keyboard, a liquid crystal display (LCD) screen, a non-volatile memory port, multiple antennas, a graphics chip, an application-specific integrated circuit (ASIC), or a speaker.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus to implement a machine type communications interworking function (MTC-IWF), comprising:
   a receiver of the MTC-IWF adapted to receive, over a first reference point from a services capability server (SCS), a device trigger request message comprising a trigger payload that is to be sent to a user equipment (UE) over a wireless communication network; and
   a transmitter of the MTC-IWF adapted to send, over a second reference point to a Mobility Management Entity (MME) or a Serving General Packet Radio Service Support Node (SGSN), the trigger payload and a request to forward the trigger payload to the UE; and a processor adapted to authorize the SCS before communication is established with the wireless communication network and to authorize control plane requests from the SCS, wherein the MTC-IWF is configured to terminate the first reference point and the second reference point, hide internal public land mobile network (PLMN) topology, and relay or translate signaling protocols used over the first reference point to invoke specific functionality in the PLMN.

2. The apparatus of claim 1, wherein the MME or the SGSN is configured to send, to a base station of the wireless communication network, a paging message that includes a small data indicator that indicates a location of the trigger payload to be forwarded to the UE.

3. The apparatus of claim 2, wherein the MME is configured to send a paging message that includes the small data indicator to the base station, the small data indicator indicating that the trigger payload is at the MME.

4. The apparatus of claim 1, wherein the authorizing the SCS before communication is established, is to indicate that the MTC-IWF is to authenticate the SCS before control plane requests from the SCS are authorized.

5. The apparatus of claim 1, wherein the MME is configured to page the UE if the UE is in idle mode.

6. A method comprising:

receiving, by an apparatus to implement a machine type communications interworking function (MTC-IWF) over a first reference point from a services capability server (SCS), a device trigger request message comprising a trigger payload that is to be sent to a user equipment (UE) over a wireless communication network; and sending, over a second reference point to a Mobility Management Entity (MME) or a Serving General Packet Radio Service Support Node (SGSN), the trigger payload and a request to forward the trigger payload to the UE, wherein the apparatus is configured to authorize the SCS before communication is established with the wireless communication network and to authorize control plane requests from the SCS, wherein the MTC-IWF is configured to terminate the first reference point and the second reference point, hide internal public land mobile network (PLMN) topology, and relay or translate signaling protocols used over the first reference point to invoke specific functionality in the PLMN.

7. The method of claim 6, further comprising:

sending, by the MME or the SGSN to a base station of the wireless communication network, a paging message that includes a small data indicator that indicates a location of the trigger payload to be forwarded to the UE.

8. The method of claim 7, further comprising:

sending, by the MME, a paging message that includes the small data indicator to the base station, the small data indicator indicating that the trigger payload is at the MME.

9. The method of claim 6, further comprising:

authorizing, by the apparatus, the SCS before communication is established to indicate that the MTC-IWF is to authenticate the SCS before control plane requests from the SCS are authorized.

10. The method of claim 6, further comprising:

paging, by the MME, the UE if the UE is in idle mode.

11. One or more non-transitory computer readable media having instructions that, when executed by one or more processors, cause a machine type communications interworking function (MTC-IWF) to:

receive, over a first reference point by the MTC-IWF from a services capability server (SCS), a device trigger request message comprising a trigger payload that is to be sent to a user equipment (UE) over a wireless communication network; and send, over a second reference point by the MTC-IWF to a Mobility Management Entity (MME) or a Serving General Packet Radio Service Support Node (SGSN), the trigger payload and a request to forward the trigger payload to the UE, wherein the MTC-IWF is configured to authorize the SCS before communication is established with the wireless communication network and to authorize control plane requests from the SCS, wherein the MTC-IWF is configured to terminate the first reference point and the second reference point, hide internal public land mobile network (PLMN) topology, and relay or translate signaling protocols used over the first reference point to invoke specific functionality in the PLMN.

12. The one or more computer readable media of claim 11, wherein the instructions when executed further cause the MTC-IWF to:

authorize the SCS before communication is established to indicate that the MTC-IWF is to authenticate the SCS before control plane requests from the SCS are authorized.

* * * * *